(12) United States Patent
Guan et al.

(10) Patent No.: US 8,444,866 B1
(45) Date of Patent: May 21, 2013

(54) METHOD AND SYSTEM FOR PROVIDING A PERPENDICULAR MAGNETIC RECORDING POLE WITH A MULTI-LAYER SIDE GAP

(75) Inventors: Lijie Guan, Milpitas, CA (US);
Changqing Shi, San Ramon, CA (US);
Ming Jiang, San Jose, CA (US);
Yun-Fei Li, Fremont, CA (US); Ying Hong, Morgan Hill, CA (US)

(73) Assignee: Westen Digital (Fremont), LLC, Fremont, CA (US)

( * ) Notice: Subject to any disclaimer, the term of this patent is extended or adjusted under 35 U.S.C. 154(b) by 164 days.

(21) Appl. No.: 12/886,999

(22) Filed: Sep. 21, 2010

(51) Int. Cl.
*B44C 1/22* (2006.01)

(52) U.S. Cl.
USPC .......... 216/22; 216/39; 29/603.01; 29/603.07

(58) Field of Classification Search
None
See application file for complete search history.

(56) References Cited

U.S. PATENT DOCUMENTS

| | | | |
|---|---|---|---|
| 5,540,346 A | 7/1996 | Fujimoto et al. | |
| 7,159,302 B2 | 1/2007 | Feldbaum et al. | |
| 7,367,112 B2 | 5/2008 | Nix et al. | |
| 7,430,095 B2 | 9/2008 | Benakli et al. | |
| 7,444,740 B1 | 11/2008 | Chung et al. | |
| 7,464,457 B2 | 12/2008 | Le et al. | |
| 7,506,431 B2 | 3/2009 | Hsiao et al. | |
| 7,549,213 B2 | 6/2009 | Hsu et al. | |
| 7,565,732 B2 | 7/2009 | Le et al. | |
| 7,576,951 B2 | 8/2009 | Allen et al. | |
| 7,979,978 B2 | 7/2011 | Han et al. | |
| 8,077,434 B1 | 12/2011 | Shen et al. | |
| 8,166,631 B1* | 5/2012 | Tran et al. | 29/603.14 |
| 8,277,669 B1 | 10/2012 | Chen et al. | |
| 8,375,564 B1 | 2/2013 | Luo et al. | |
| 2005/0237665 A1 | 10/2005 | Guan et al. | |
| 2006/0044681 A1 | 3/2006 | Le et al. | |
| 2006/0044682 A1 | 3/2006 | Le et al. | |
| 2006/0225268 A1 | 10/2006 | Le et al. | |
| 2006/0288565 A1 | 12/2006 | Le et al. | |
| 2007/0115584 A1 | 5/2007 | Balamane et al. | |
| 2007/0177301 A1 | 8/2007 | Han et al. | |
| 2008/0026254 A1 | 1/2008 | Hsiao et al. | |
| 2008/0100959 A1 | 5/2008 | Feldbaum et al. | |
| 2008/0110761 A1 | 5/2008 | Lam et al. | |
| 2008/0113090 A1 | 5/2008 | Lam et al. | |
| 2008/0151437 A1 | 6/2008 | Chen et al. | |
| 2008/0253035 A1* | 10/2008 | Han et al. | 360/319 |
| 2008/0273276 A1 | 11/2008 | Guan | |
| 2008/0273277 A1 | 11/2008 | Guan et al. | |
| 2008/0278861 A1 | 11/2008 | Jiang et al. | |
| 2008/0297945 A1 | 12/2008 | Han et al. | |
| 2009/0002885 A1 | 1/2009 | Sin | |
| 2009/0116145 A1 | 5/2009 | Guan et al. | |

(Continued)

*Primary Examiner* — Lan Vinh
*Assistant Examiner* — Jiong-Ping Lu

(57) ABSTRACT

A method for fabricating a magnetic transducer having a nonmagnetic intermediate layer is described. A trench is provided in the intermediate layer. The trench has a profile and location corresponding to a pole. A first nonmagnetic gap layer is provided. At least part of the first nonmagnetic gap layer resides in the trench. A pole including magnetic material(s) is provided. At least part of the pole resides in the trench and on the part of the nonmagnetic layer in the trench. At least part of the intermediate layer adjacent to the pole is removed and a second nonmagnetic gap layer provided. The second nonmagnetic gap layer is thicker than the first nonmagnetic gap layer. Part of the second nonmagnetic layer and part of the first nonmagnetic layer adjacent to the pole form a side gap. A side shield, a gap, and a top shield are also provided.

21 Claims, 10 Drawing Sheets

U.S. PATENT DOCUMENTS

| | | |
|---|---|---|
| 2009/0128952 A1 | 5/2009 | Sato et al. |
| 2009/0168242 A1 | 7/2009 | Liu |
| 2009/0184091 A1 | 7/2009 | Zheng |
| 2009/0195920 A1 | 8/2009 | Bonhote et al. |
| 2010/0061016 A1* | 3/2010 | Han et al. .................. 360/125.3 |
| 2010/0062177 A1 | 3/2010 | Jiang et al. |
| 2010/0112486 A1 | 5/2010 | Zhang et al. |
| 2011/0094888 A1* | 4/2011 | Chen et al. ..................... 205/81 |

* cited by examiner

200

METHOD AND SYSTEM FOR PROVIDING A PERPENDICULAR MAGNETIC RECORDING POLE WITH A MULTI-LAYER SIDE GAP

BACKGROUND

FIG. 1 is a flow chart depicting a conventional method 10 for fabricating a conventional perpendicular magnetic recording (PMR) transducer. For simplicity, some steps are omitted. The conventional method 10 is used for providing a PMR pole in an aluminum oxide layer. A trench is formed in the aluminum oxide layer, via step 12. The top of the trench is wider than the trench bottom. As a result, the PMR pole formed therein will have its top surface wider than its bottom. Consequently, the sidewalls of the PMR pole will have a reverse angle. A Ru gap layer is deposited, via step 14. The Ru gap layer is used in forming a side gap. Step 14 typically includes depositing the Ru gap layer using chemical vapor deposition (CVD). The conventional PMR pole materials are plated, via step 16. Step 16 may include plating ferromagnetic pole materials as well as seed and/or other layer(s). A chemical mechanical planarization (CMP) is then performed, via step 18. The write gap and top shield are then deposited, via steps 20 and 22, respectively.

FIG. 2 depicts plan and air-bearing surface (ABS) views of a portion of a conventional PMR transducer 50 formed using the conventional method 10. The conventional transducer 50 includes an underlayer 52, Ru gap layer 54 which is deposited in the trench (not shown). The pole 60, write gap 70 and top shield 80 are also shown. Thus, using the conventional method 10, the pole 60 may be formed.

Although the conventional method 10 may provide the conventional PMR transducer 50, there may be drawbacks. The performance of the conventional PMR transducer 50 is desired to be improved. The magnetic track width variation is also desired to be reduced. In order to do so, the geometry of the conventional pole 60 is desired to be well controlled during fabrication. For example, the radius of curvature at the corner 66 near the nose length is desired to be small. Using the method 10, the radius of curvature at the corner 64 of the Ru gap layer 54 is small. However, inside the Ru gap layer 54, the corner 66 of the pole 60 is less sharp. Stated differently, the radius of curvature of the pole 60 is larger. Consequently, the magnetic track width variation may be larger than desired. In addition, as can be seen in FIG. 2, the variation in the width of the side gap layers 54 may be larger than desired. Performance and manufacturability of the conventional magnetic recording transducer 50 may thus be adversely affected. Accordingly, what is needed is an improved method for fabricating a PMR transducer.

SUMMARY

A method for fabricating a magnetic transducer having a nonmagnetic intermediate layer is described. The method includes providing a trench in the intermediate layer and providing a first nonmagnetic gap layer. The trench has a profile and a location corresponding to a pole of the magnetic transducer. At least a portion of the first nonmagnetic gap layer resides in the trench. The method also includes providing a pole including at least one magnetic material. At least a portion of the pole resides in the trench and on the portion of the nonmagnetic layer in the trench. The method also includes removing at least a portion of the intermediate layer adjacent to the pole and then providing a second nonmagnetic gap layer. The second nonmagnetic gap layer is thicker than the first nonmagnetic gap layer. A portion of the second nonmagnetic layer and a portion of the first nonmagnetic layer adjacent to the pole form a side gap. The method also includes providing a side shield and providing a gap. The gap is on the pole, the side gap, and a portion of the side shield. The method also provides a top shield.

DETAILED DESCRIPTION OF THE PREFERRED EMBODIMENTS

Figure 1:
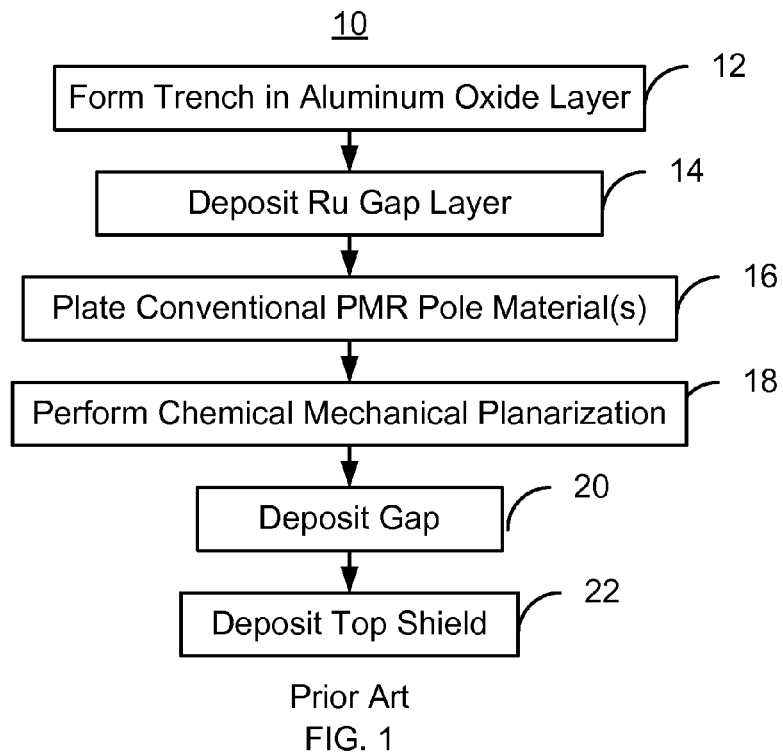
FIG. 1 is a flow chart depicting a conventional method for fabricating a PMR transducer.
Figure 2:
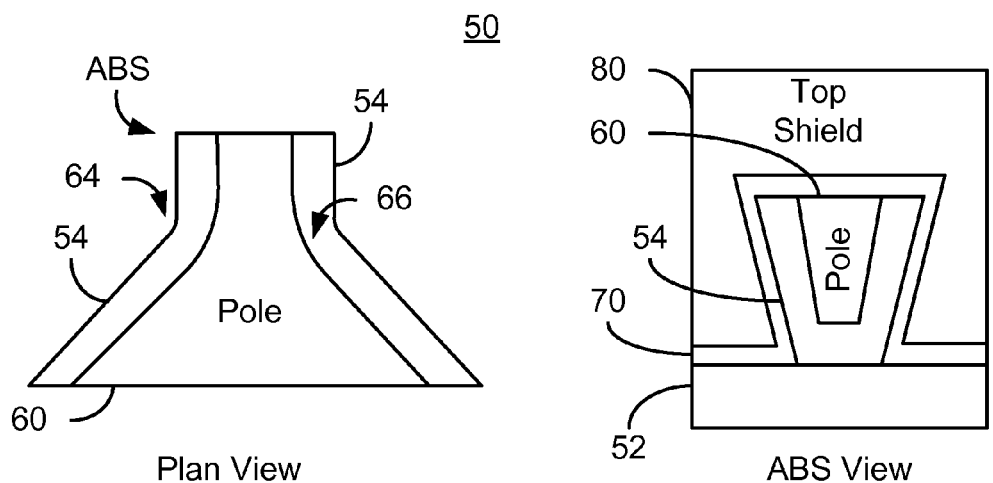
FIG. 2 is a diagram depicting plan and ABS views of a conventional PMR transducer.
Figure 3:
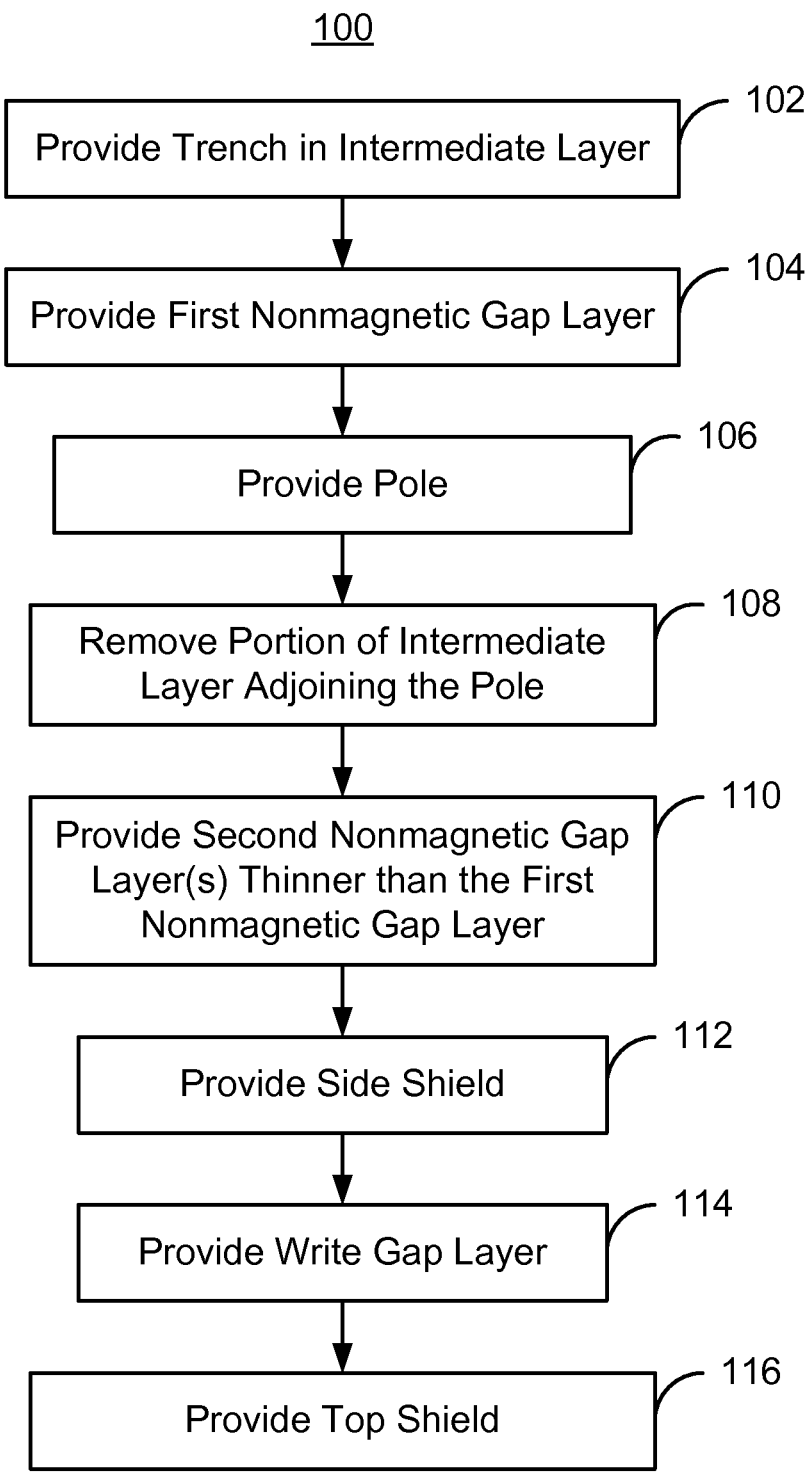
FIG. 3 is a flow chart depicting an exemplary embodiment of a method for fabricating a PMR transducer.

FIG. 3 is a flow chart depicting an exemplary embodiment of a method 100 for fabricating a transducer. The method 100 is described in the context of a PMR transducer, though other transducers might be so fabricated. For simplicity, some steps may be omitted and/or combined. The PMR transducer being fabricated may be part of a merged head that also includes a read head (not shown) and resides on a slider (not shown) in a disk drive. The method 100 also may commence after formation of other portions of the PMR transducer. The method 100 is also described in the context of providing a single PMR pole and its associated structures in a single magnetic recording transducer. However, the method 100 may be used to fabricate multiple transducers at substantially the same time. The method 100 and system are also described in the context of particular layers. However, in some embodiments, such layers may include multiple sub-layers. In one embodiment, the method 100 commences after formation of the underlayer (s) on which the PMR pole is to reside as well as a nonmagnetic intermediate layer. In some embodiments, the intermediate layer is an aluminum oxide layer. In addition, the underlayer may include an etch stop layer. Further, in some embodiments, a leading edge shield is desired. In such embodiments, the leading edge shield may be provided under the underlayer. The leading edge shield is generally ferromagnetic, magnetically soft, and may include materials such as NiFe.

A trench is formed in a portion of the intermediate, via step 102. Trench formation may include a reactive ion etch (RIE). The RIE may terminate in the stop layer. Thus, the trench bottom may be formed by a portion of the stop layer. However, in alternate embodiments, the trench may terminate in other layers including but not limited to the intermediate layer and an underlying shield layer. The RIE used in step 102 may be an aluminum oxide RIE. The trench has a profile and a location that correspond to the pole being formed. Thus, the trench may have a top wider than its bottom and is located where the pole is to be formed.

A first nonmagnetic gap layer is provided, via step 104. At least a portion of the first nonmagnetic gap layer resides in the trench formed in step 102. Thus, step 104 may include blanket depositing the nonmagnetic gap layer over a region that extends across the trench. The first nonmagnetic gap layer may be a Ru layer. In some embodiments, step 104 includes performing chemical vapor deposition (CVD) of the layer of Ru. The first nonmagnetic gap layer has a thickness that is less than the total desired thickness of the side gap. In some embodiments, the first nonmagnetic gap layer is at least five and not more than thirty-five nanometers thick. In some such embodiments, the first nonmagnetic gap layer is at least fifteen and not more than twenty-five nanometers thick.

The pole is provided in the trench, via step 106. Step 106 may include providing one or more seed layers, and then depositing the magnetic layer(s) for the pole. For example sputtering and/or plating may be used for the magnetic layers. The magnetic layer(s) deposited are desired to be high moment layers, which may be plated. At least part of the magnetic layer(s) resides in the trench as well as on the part of the first nonmagnetic layer in the trench. In addition, step 106 may include planarizing the magnetic transducer. Thus, an exposed portion of the first nonmagnetic gap layer external to the trench and an exposed portion of the at least one magnetic layer external to the trench may be removed. The pole may then include the remaining magnetic material in the trench.

A portion of the intermediate layer adjacent to the pole is removed, via step 108. In some embodiments, all of the intermediate layer in the device region is removed. Step 108 may include wet etching the intermediate layer, for example using an aluminum oxide wet etch.

A second nonmagnetic gap layer is provided after the portion of the intermediate layer adjacent to the pole is removed, via step 110. In some embodiments, the second nonmagnetic gap layer may include multiple sublayers. For example, the second nonmagnetic gap layer may include a layer of aluminum oxide and a Ru layer. In some embodiments, the Ru layer is formed via CVD, while the aluminum oxide layer may be formed using atomic layer deposition (ALD). In other embodiments, the second nonmagnetic gap layer may be a single layer, such as a layer of Ru. The second nonmagnetic gap layer provided in step 110 thicker than the first nonmagnetic gap layer deposited in step 104. For example, the second nonmagnetic gap layer may be at least twenty and not more than one hundred nanometers thick. In some such embodiments, the second nonmagnetic gap layer is at least twenty-five and not more than thirty-five nanometers thick. If the second nonmagnetic gap includes only a Ru layer, then the Ru layer may have the above thicknesses. If a bilayer is used, then the insulating layer (e.g. aluminum oxide layer) may be at least fifteen and not more than sixty nanometers thick and the additional Ru layer may be at least five and not more than thirty five nanometers thick. In some such embodiments, the Ru layer is at least fifteen and not more than twenty-five nanometers thick. However, the total thickness of the second nonmagnetic layer is greater than the thickness of the first nonmagnetic layer. In some embodiments, therefore, the first nonmagnetic gap layer and the second nonmagnetic gap layer together have a total thickness of at least thirty nanometers and not more than one hundred nanometers. In some embodiments, the total thickness of the first and second nonmagnetic gap layers together is at least thirty and not more than ninety nanometers. A portion of the second nonmagnetic layer and a portion of the first nonmagnetic layer adjacent to the pole form a side gap for the transducer being fabricated.

A side shield is provided, via step 112. Step 112 may include depositing a high permeability layer, such as NiFe, and planarizing the transducer. Thus, portion of the second gap layer on the pole may be exposed. In addition, the pole may be exposed either through the CMP or through an additional removal step, such as an ion mill.

A write gap is provided, via step 114. Step 114 thus includes depositing a nonmagnetic layer. At least a portion of the write gap resides on the pole and on the side gap. In some embodiments, part of the write gap extends to cover at least part of the side shield. Step 114 may thus include blanket depositing a nonmagnetic gap layer and removing a portion of the gap layer distal from the pole. A top shield is provided, via step 116.

Figure 4:
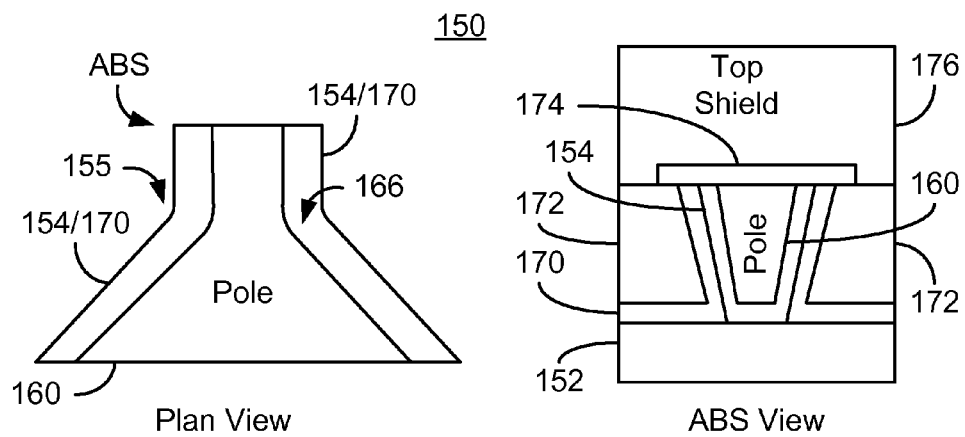
FIG. 4 is a diagram depicting an exemplary embodiment of a PMR transducer.
Figure 5:
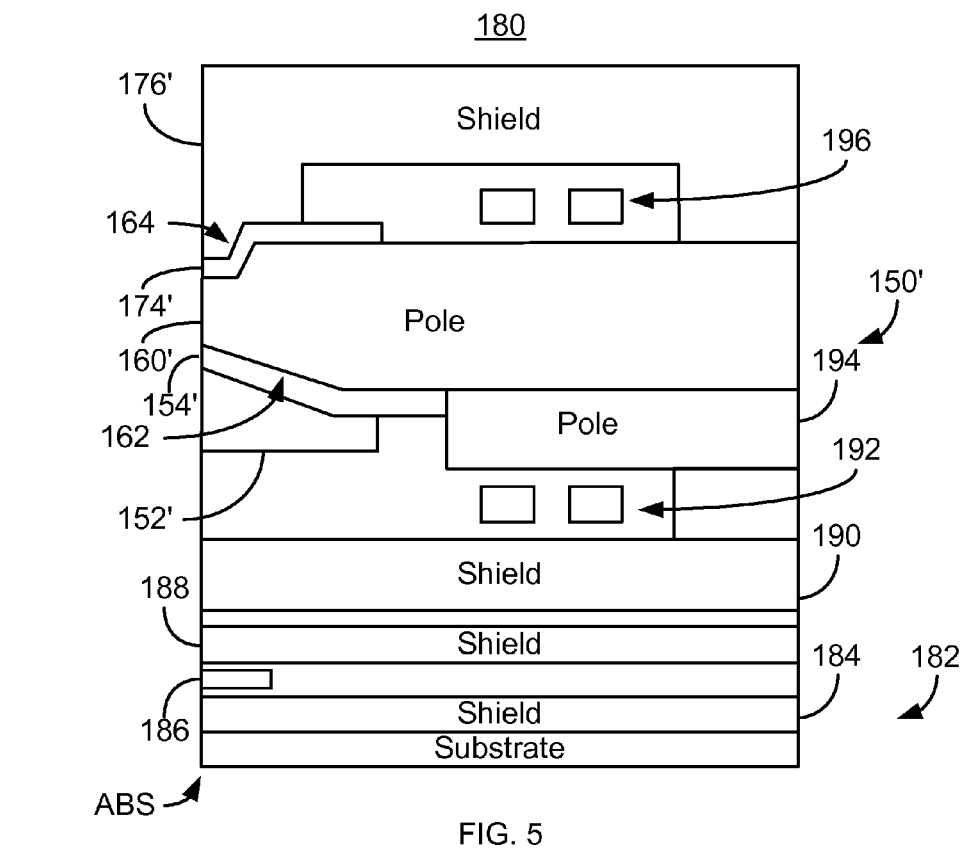
FIG. 5 is a diagram depicting an exemplary embodiment of a PMR head.

FIG. 4 is a diagram depicting an exemplary embodiment of a portion of a PMR transducer 150 that may be formed using the method 100. FIG. 5 depicts a head 180 incorporating the transducer 200. For clarity, FIGS. 4-5 are not to scale. FIG. 4 depicts plan and ABS views of the transducer 200, while FIG. 5 depicts a side view only of the head 180. The head 180 shown includes a read transducer 182 and the PMR transducer 150'. However, in another embodiment, the transducer 150/150' may be used in a head including only one or more write transducers 150/150'. The read transducer 182 includes shields 184 and 188 as well as sensor 186. The PMR transducer 150' shown in FIG. 5 includes shield 190, pole 194 and coils 192 in addition to the PMR transducer 150'. The PMR transducer 150/150' includes underlay 152/152', first and second nonmagnetic layer(s) 154/154' and 170, pole 160/160', write gap 174/174', side shields 172, write gap 174/174', and trailing shield 176/176'. Other and/or different components may be fabricated in other embodiments. For example, a leading shield (not shown) may be included. In some such embodiments, a stop layer may also reside between the leading shield and the bottom of the pole 160/160'. In addition the, the pole 160 is shown as includes an optional leading edge bevel 162 and an optional trailing bevel 164. However, in some embodiments, the bevels 162 and/or 164 may be omitted. Also shown is the ABS. As shown in the plan view, the pole 160 has corner 166, while the nonmagnetic layers 154/170 has corners 155.

Using the method 100, pole 160/160' having the desired geometry may be fabricated. More specifically, the corners 166 of the pole 160/160' may be sharper, having a smaller radius of curvature. In addition, the thicknesses of the layers 154 and 170 are well controlled. Thus, the side gap 154/170 thickness may be better controlled. As a result, the variation in the magnetic track width may be reduced. Consequently, manufacturing and performance of the transducer 150/150' and head 180 may be improved. Further, the write gap 174/174' and side gaps 154/170 may be separately optimized. Performance of the magnetic transducer 150/150' and head 180 may thus be enhanced. The side shields 172 and trailing shield 176/176' may be coupled. Thus, the control of the side shield 172 may also be enhanced.

Figure 6:
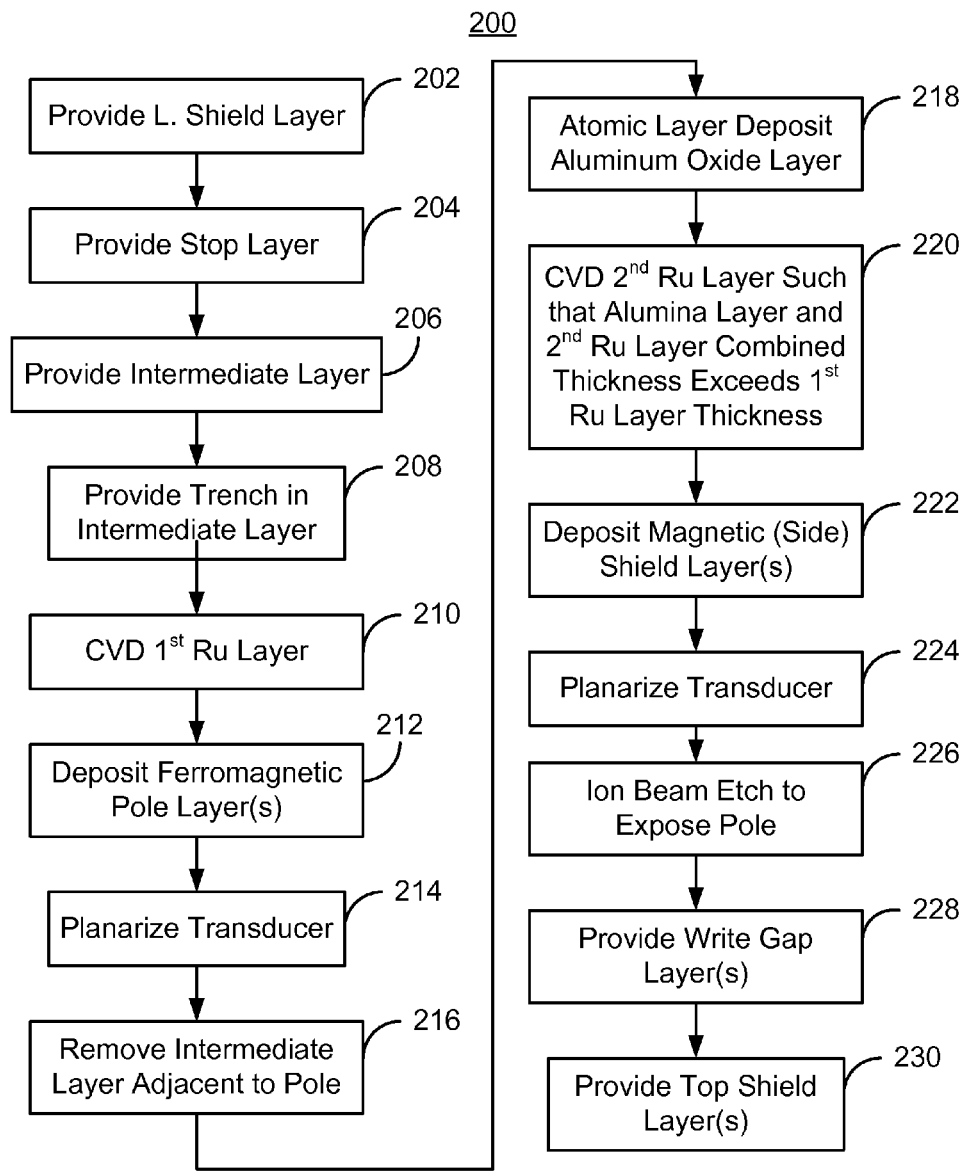
FIG. 6 is a flow chart depicting another exemplary embodiment of a method for fabricating a PMR transducer.

FIG. 6 is a flow chart depicting another exemplary embodiment of a method 200 for fabricating a PMR transducer. For simplicity, some steps may be omitted. FIGS. 7-17 are diagrams depicting side and ABS views of an exemplary embodiment of a portion of a PMR transducer during 250 fabrication. For clarity, FIGS. 7-17 are not to scale. The side views in FIGS. 7-17 are taken in the middle of the location at which the pole is formed. Further, although FIGS. 7-17 depict the ABS location (location at which the ABS is to be formed) and ABS at a particular point in the pole, other embodiments may have other locations for the ABS. Referring to FIGS. 6-17, the method 200 is described in the context of the PMR transducer 250. However, the method 200 may be used to form another device (not shown). The PMR transducer 250 being fabricated may be part of a merged head that also includes a read head (not shown in FIGS. 7-17) and resides on a slider (not shown) in a disk drive. The method 200 also may commence after formation of other portions of the PMR transducer 250. The method 200 is also described in the context of providing a single PMR transducer 250. However, the method 200 may be used to fabricate multiple transducers at substantially the same time. The method 200 and device 250 are also described in the context of particular layers. However, in some embodiments, such layers may include multiple sublayers.

A leading shield layer is deposited, via step 202. For example, a NiFe layer may be deposited. In some embodiments, the leading shield layer is deposited on a flat surface, for example a surface that has undergone a CMP. A planarization layer is deposited on the leading shield, via step 204. In some embodiments, step 204 may include depositing a multilayer. An intermediate layer is deposited, via step 206. For example, the intermediate layer may be aluminum oxide. The stop layer provided in step 204 is a stop layer for a removal process used to remove portions of the intermediate layer.

Figure 7:
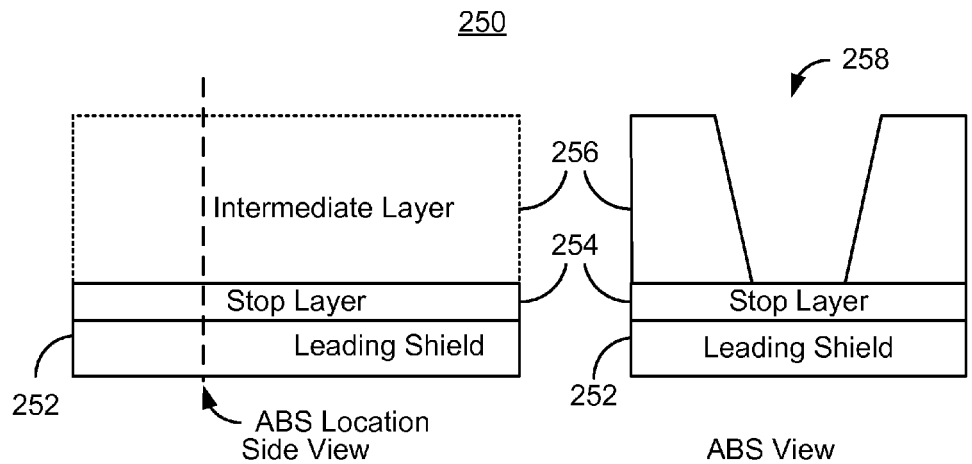
FIGS. 7-17 are diagrams depicting an exemplary embodiment of a magnetic recording transducer during fabrication.

A trench is then formed in the intermediate layer, via step 208. Step 208 includes providing a mask having an aperture therein. In some embodiments, the mask includes a hard mask having one or more layers. The aperture corresponds to the location and footprint of the trench. The trench may be formed, for example by an alumina RIE. FIG. 7 depicts the transducer 250 after step 208 has been performed. Thus, a leading shield 252 and stop layer 254 are shown. In other embodiments, the leading shield 252 may be omitted. Also shown are intermediate layer 256 having trench 258 therein. In the side view, the intermediate layer 256 is shown by a dashed line as the portion of the intermediate layer 256 in the center of the trench 258 has been removed. In the embodiment shown, the top surface of the stop layer 254 forms the bottom of the trench 258. However, in other embodiments, the bottom of the trench 258 may be within the intermediate layer 256, within the stop layer 254, within the leading shield 252 or at another location. The trench 258 has a profile and location corresponding to the pole to be formed. Thus, the top of the trench 258 is wider than the bottom. Although not shown, in some embodiments, the bottom of the trench 258 might be configured to form a leading edge bevel in the pole being fabricated.

Figure 8:
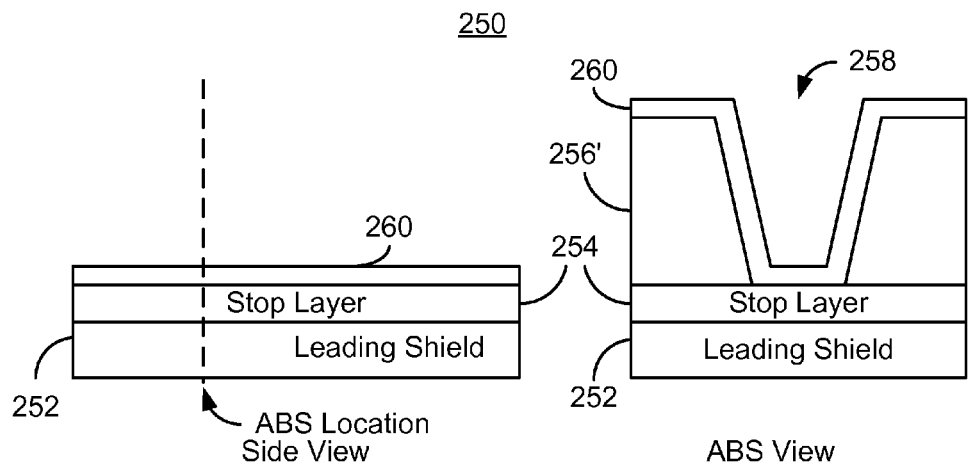

A first nonmagnetic layer is deposited in step 210. In some embodiments, step 210 includes depositing a first Ru layer via CVD. FIG. 8 depicts the transducer 250 after step 210 is performed. Thus, layer 260 is shown. In some embodiments, the layer 260 is at least five and not more than thirty-five nanometers thick. In some such embodiments, the first Ru layer 260 is at least fifteen and not more than twenty-five nanometers thick.

Figure 9:
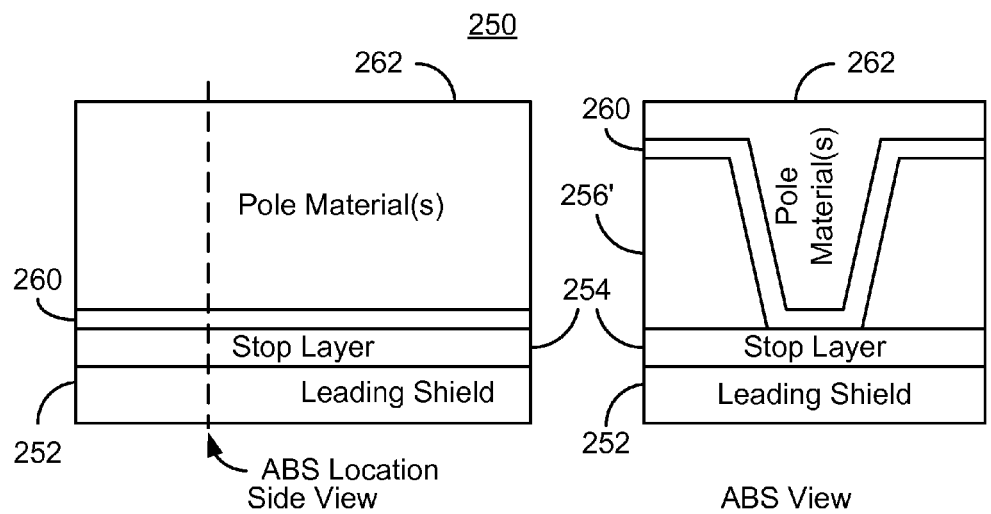

The magnetic material(s) for the pole are deposited, via step 212. Step 212 thus includes providing one or more layers. For example, CoNiFe may be plated in step 212. In other embodiments, different deposition techniques and/or materials may be used. Further, in some embodiments, magnetic and/or nonmagnetic seed layers may also be deposited. In some embodiments, the full film is plated in step 212. Thus, a frame may be provided and portions of the full film etched in step 212. FIG. 9 depicts the transducer after the pole material(s) have been deposited. Thus, magnetic materials 262 are shown.

Figure 10:
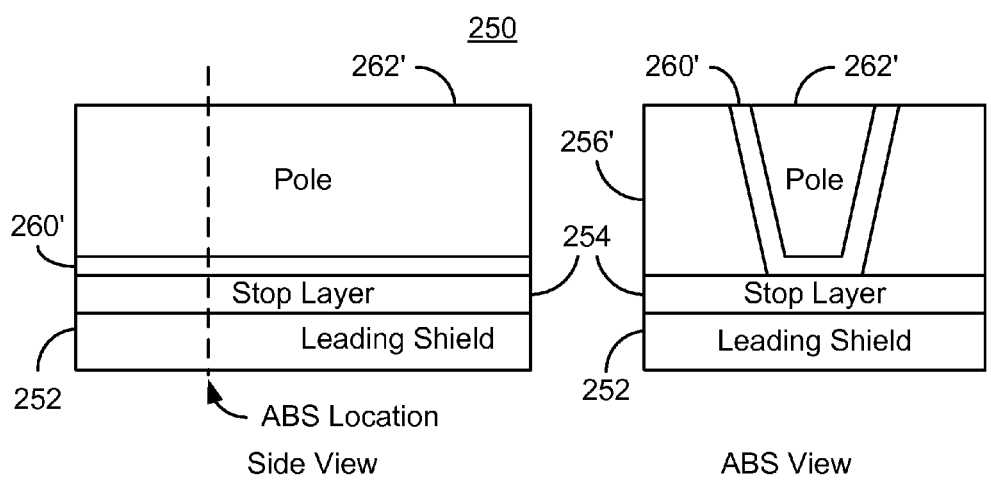

The transducer is planarized, via step 214. The planarization performed in step 214 may include a CMP. In some embodiments, step 214 also includes ion beam etching the transducer. FIG. 10 depicts the transducer 250 after step 214 is completed. Thus, the portions of the pole materials 262 have been removed, leaving pole 262'. The top of the pole 262' is thus substantially coplanar with the tops of the intermediate layer 256'. Portions of the first nonmagnetic layer 260 have also been removed, leaving first nonmagnetic layer 260' adjoining the pole 262'.

Figure 11:
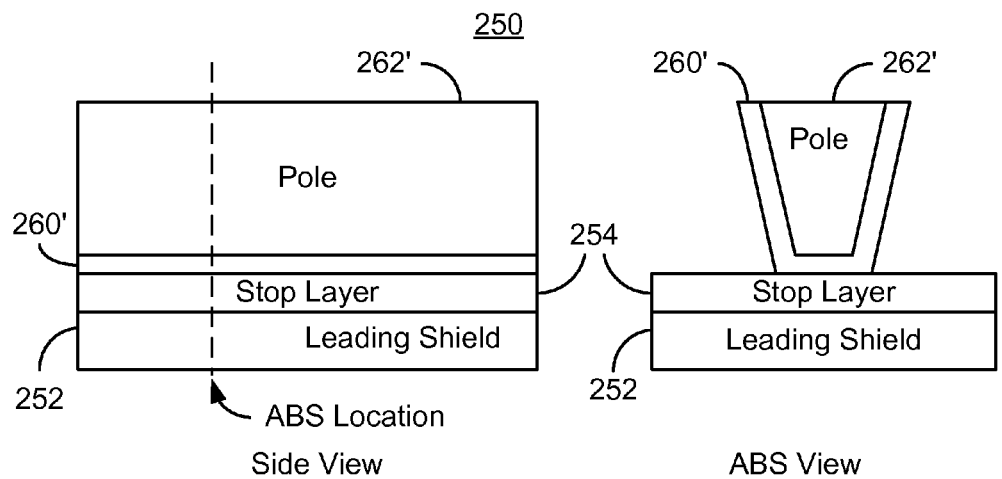

The transducer is wet etched to remove the intermediate layer adjacent to the pole 262', via step 216. For example, one or more solvents appropriate for the intermediate layer 256' are used in step 164. Thus, the portion of the intermediate layer adjoining the first nonmagnetic layer 260' is removed. FIG. 11 depicts the transducer 250 after step 216 is completed. Thus, the intermediate layer 256' has been removed.

Figure 12:
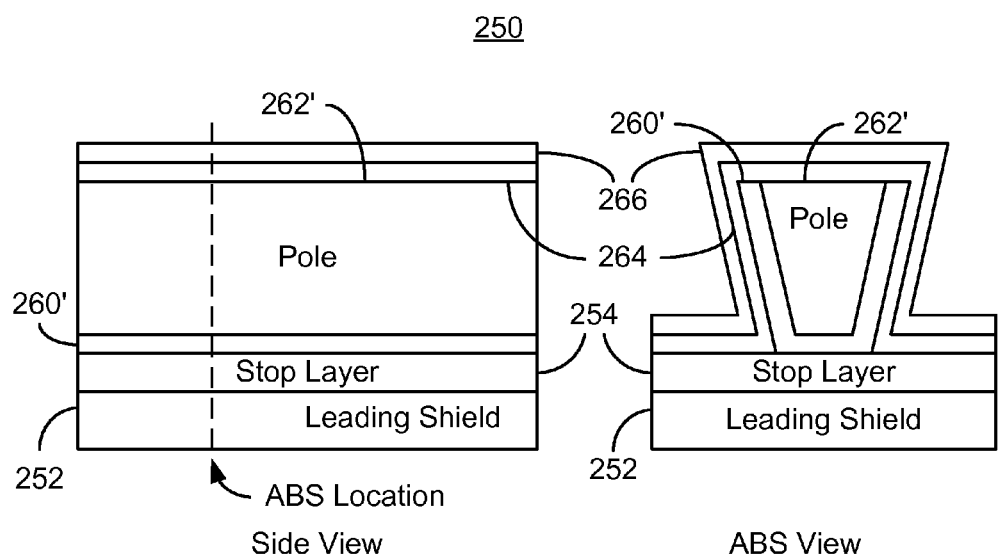

An aluminum oxide layer is deposited using ALD, via step 218. An additional Ru layer is then deposited, via step 220. The additional Ru layer may be deposited using CVD. In some embodiments, the aluminum oxide layer is at least fifteen and not more than sixty nanometers thick. The additional Ru layer may be at least five and not more than thirty-five nanometers thick. In some such embodiments, the additional Ru layer is at least fifteen and not more than twenty-five nanometers thick. The total combined thickness of the aluminum oxide and Ru layers is desired to be at least thirty nanometers and not more than one hundred nanometers. In addition, the total combined thickness of the aluminum oxide and Ru layers is also desired to be greater than the thickness of the first Ru layer deposited in step 210. FIG. 12 depicts the transducer 250 after step 220 has been completed. Thus, the aluminum oxide layer 264 and the Ru layer 266 are shown. Note that although the aluminum oxide layer 264 and Ru layer 266 are shown as having substantially the same thickness in FIG. 12, the relationship between the thicknesses of the layers 264 and 266 may differ. Further, although shown as approximately twice as thick as the first Ru layer 260', the total combined thickness of the layers 264 and 266 may have another value as long as the combined thickness is greater than the thickness of the first Ru layer 260'.

Figure 13:
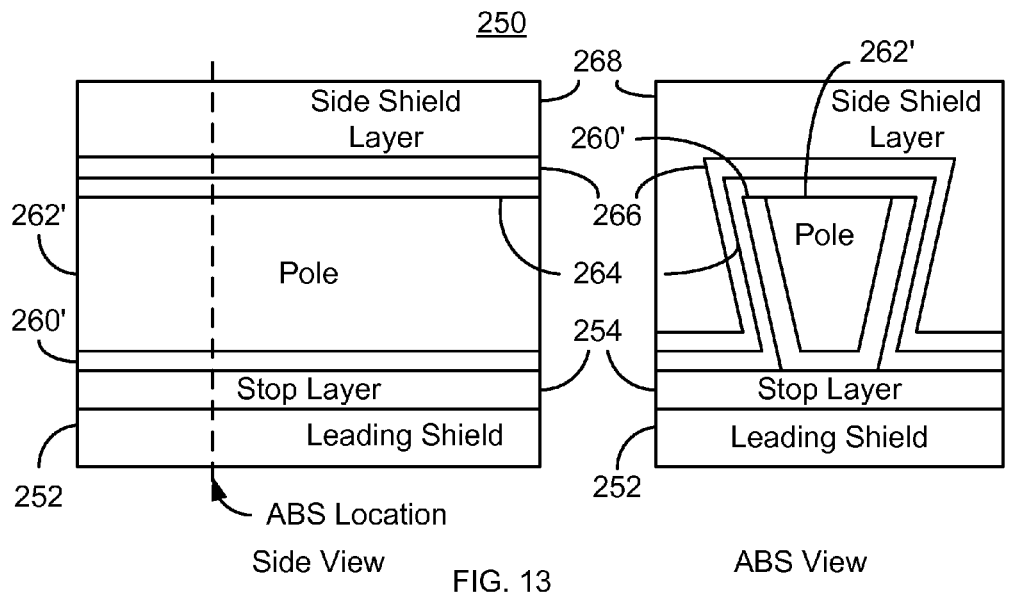

A magnetic side shield is also plated, via step 222. For example, NiFe may be plated. Also in step 222 seed layer(s) may be deposited. FIG. 13 depicts the transducer 250 after step 222 is completed. Thus, magnetic side shield layer(s) 268 are shown. The side shield layer(s) 268 adjoin the nonmagnetic layer 266.

Figure 14:
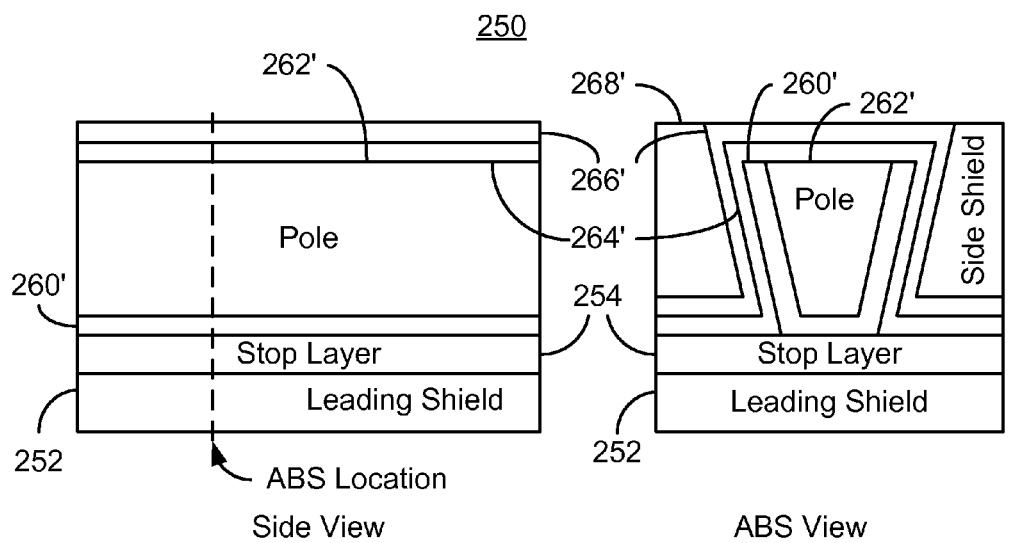
Figure 15:
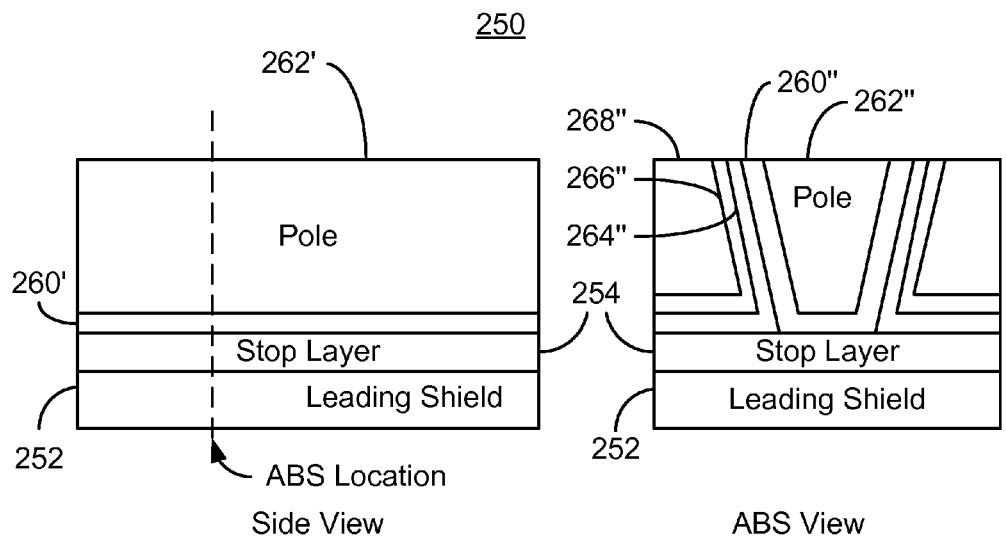

The transducer is planarized, via step 224. FIG. 14 depicts the transducer 250 after step 224. For example, a CMP may be performed. Thus, the excess portion of the side shield materials 268 have been removed, leaving side shield materials 268'. In addition, the pole 262' may be exposed using an ion beam etch, via step 226. Steps 222-226 may thus be considered to form the side shields. FIG. 15 depicts the transducer 250 after step 226 is performed. Thus, side shields 268" have been formed. In addition, the top of the pole 262" has been exposed. Nonmagnetic layers 260", 264", and 266" also remain at the sides of the pole. A portion of the nonmagnetic layer 260' is also below the pole, while portions of the layers 266" and 268" are below the side shields 268".

Figure 16:
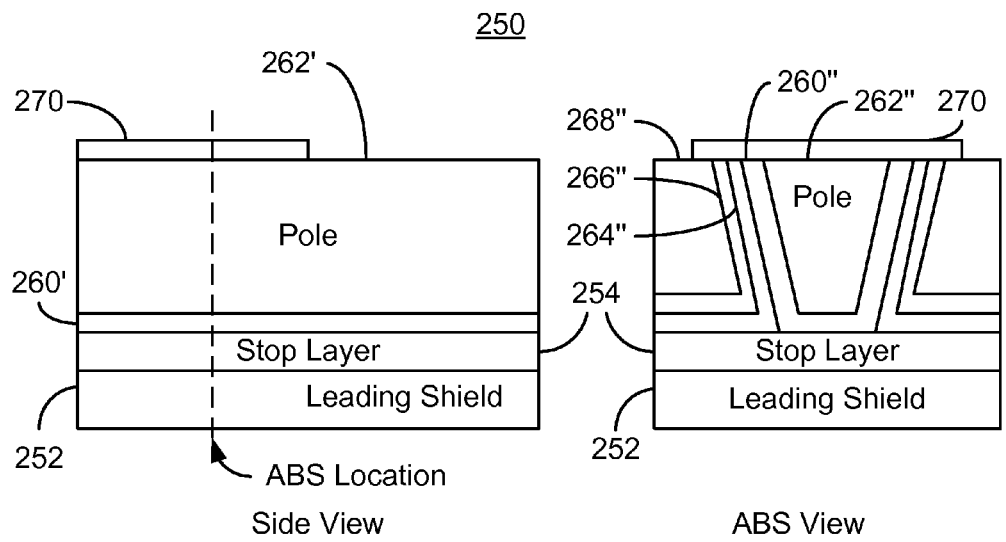

A write gap may be provided, via step 228. For example, step 228 may include providing a layer of alumina using atomic layer deposition and removing a portion of the gap layer distal from the pole 262". FIG. 16 depicts the transducer 250 after step 228 is performed. Thus, a gap layer 270 is shown.

Figure 17:
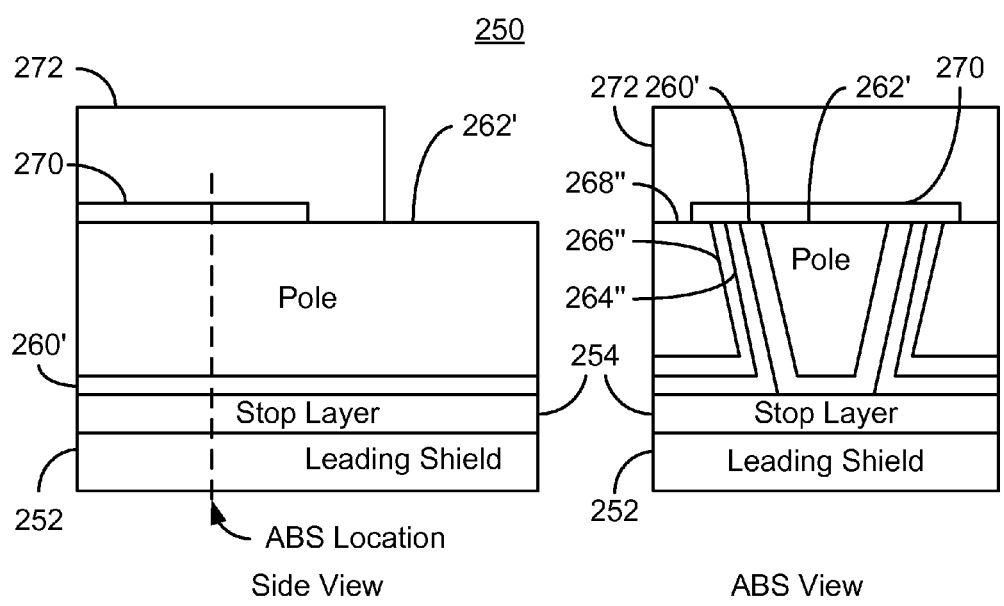

A trailing edge, or top, shield may then be provided, via step 230. FIG. 17 depicts the transducer 250 after step 230. Thus, top shield material 272 is shown. The shield materials 272 may include CoNiFe.

Thus, using the method 200, the PMR transducer 250 may be fabricated. The PMR transducer 250 has the desired geometry. For example, the corners of the pole 262' may have a smaller radius of curvature and the thickness of the side gap 260'/264'/266' may be better controlled. Further, the write gap 270 and side gap 260'/264'/266' can be independently controlled and optimized. Consequently, manufacturing and performance of the transducer 250 may be improved.

We claim:

1. A method for fabricating a magnetic transducer having an intermediate layer, the method comprising:
   providing a trench in the intermediate layer, the trench having a profile and a location corresponding to a pole of the magnetic transducer, the intermediate layer being nonmagnetic;
   providing a first nonmagnetic gap layer, at least a portion of the first nonmagnetic gap layer residing in the trench;
   providing the pole including at least one magnetic material, at least a portion of the pole residing in the trench and on the portion of the first nonmagnetic layer;
   removing at least a portion of the intermediate layer adjacent to the pole;
   providing a second nonmagnetic gap layer after the portion of the intermediate layer is removed, the second nonmagnetic gap layer being thicker than the first nonmagnetic gap layer, a portion of the second nonmagnetic layer and a portion of the first nonmagnetic layer adjacent to the pole forming a side gap;
   providing a side shield;
   providing a gap on the pole, the side gap, and a portion of the side shield; and
   providing a top shield,
   wherein the step of providing the second nonmagnetic gap layer further includes;
   atomic layer depositing an insulating layer; and
   chemical vapor depositing an additional layer of Ru.

2. The method of claim 1 wherein the step of providing the first nonmagnetic gap layer further includes:
   chemical vapor depositing a layer of Ru.

3. The method of claim 2 wherein the layer of Ru is at least five and not more than thirty-five nanometers thick.

4. The method of claim 3 wherein the layer of Ru is at least fifteen and not more than twenty-five nanometers thick.

5. The method of claim 1 wherein the step of providing the second nonmagnetic gap layer further includes:
   chemical vapor depositing an additional layer of Ru.

6. The method of claim 5 wherein the additional layer of Ru is at least twenty and not more than one hundred nanometers thick.

7. The method of claim 6 wherein the layer of Ru is at least twenty-five and not more than thirty-five nanometers thick.

8. The method of claim 1 wherein the insulating layer is at least fifteen and not more than sixty nanometers thick and wherein the additional layer of Ru is at least five and not more than thirty five nanometers thick.

9. The method of claim 8 wherein the additional layer of Ru is at least fifteen and not more than twenty-five nanometers thick.

10. The method of claim 1 wherein the first nonmagnetic gap layer and the second nonmagnetic gap layer together have a total thickness of at least thirty nanometers and not more than one hundred nanometers.

11. The method of claim 10 wherein the total thickness is at least thirty and not more than ninety nanometers.

12. The method of claim 1 wherein the step of providing the pole further includes:
   depositing at least one magnetic layer on the first nonmagnetic gap layer; and
   planarizing the magnetic transducer, thereby removing an exposed portion of the first nonmagnetic gap layer external to the trench and an exposed portion of the at least one magnetic layer external to the trench.

13. The method of claim 12 wherein the step of depositing the at least one magnetic layer further includes:
   plating a high moment layer.

14. The method of claim 1 wherein the step of providing the side shield further includes:
   depositing at least one magnetic shield layer on the second nonmagnetic gap layer;
   planarizing the magnetic recording transducer to remove a portion of the at least one magnetic shield layer; and
   ion beam etching the magnetic recording transducer, thereby exposing the pole.

15. The method of claim 14 wherein the step of depositing the at least one magnetic shield layer further includes:
   plating the at least one magnetic shield layer.

16. The method of claim 1 wherein the step of providing the gap further includes:
   blanket depositing a gap layer; and
   removing a portion of the gap layer distal from the pole.

17. The method of claim 1 further comprising:
   providing a leading edge shield.

18. The method of claim 17 wherein the trench is provided using a removal process for the intermediate layer and wherein the method further includes:
   depositing a stop layer on the leading edge shield, the stop layer residing between the leading edge shield and the pole, the stop layer being a stop layer for the removal process.

19. A method for fabricating a magnetic transducer having an intermediate layer, the method comprising:
   providing a trench in the intermediate layer, the trench having a profile and a location corresponding to a pole of the magnetic transducer, the intermediate layer being nonmagnetic;
   chemical vapor depositing (CVDing) a first Ru layer, at least a portion of the first Ru layer residing in the trench;
   depositing at least one magnetic layer on the first Ru layer;
   planarizing the magnetic transducer to remove a first portion of the first Ru layer external the trench, to remove a first portion of the at least one magnetic layer external to the trench, thereby leaving the pole and a second portion of the first Ru layer in the trench;
   removing a portion of the intermediate layer adjacent to the pole;
   atomic layer depositing a layer of alumina after the portion of the intermediate layer is removed;
   CVDing a second Ru layer after the layer of alumina is deposited, a total thickness of the second Ru layer plus the layer of alumina being thicker than the first Ru layer;
   depositing a magnetic shield layer on the second Ru layer;
   planarizing the magnetic recording transducer to remove a portion of the magnetic shield layer;
   ion beam etching the magnetic recording transducer, thereby exposing the pole, a remaining portion of the high permeability layer forming a side shield;
   providing a gap on the pole, a portion of the side gap, and a portion of the side shield; and
   providing a top shield.

20. The method of claim 19 further comprising:
   providing a leading edge shield.

21. The method of claim 20 wherein the trench is provided using a removal process for the intermediate layer and wherein the method further includes:

depositing a stop layer on the leading edge shield, the stop layer residing between the leading edge shield and the pole, the stop layer being a stop layer for the removal process.

* * * * *